US007975025B1

(12) United States Patent
Szabo et al.

(10) Patent No.: US 7,975,025 B1
(45) Date of Patent: Jul. 5, 2011

(54) SMART PREFETCHING OF DATA OVER A NETWORK

(75) Inventors: Paul I. Szabo, Seattle, WA (US); Saxon Carl Amdahl, Mountain View, CA (US)

(73) Assignee: F5 Networks, Inc., Seattle, WA (US)

( * ) Notice: Subject to any disclaimer, the term of this patent is extended or adjusted under 35 U.S.C. 154(b) by 196 days.

(21) Appl. No.: 12/169,366

(22) Filed: Jul. 8, 2008

(51) Int. Cl.
*G06F 15/16* (2006.01)

(52) U.S. Cl. ............... 709/218; 709/203; 709/250

(58) Field of Classification Search .......... 370/230, 370/395.53; 705/51; 707/1, 9; 709/203, 709/213, 219, 225, 235, 202, 218; 711/118, 711/158, 163, 204; 715/738
See application file for complete search history.

(56) References Cited

U.S. PATENT DOCUMENTS

| | | | |
|---|---|---|---|
| 3,950,735 A | 4/1976 | Patel | |
| 4,644,532 A | 2/1987 | George et al. | |
| 4,965,772 A | 10/1990 | Daniel et al. | |
| 5,023,826 A | 6/1991 | Patel | |
| 5,053,953 A | 10/1991 | Patel | |
| 5,299,312 A | 3/1994 | Rocco, Jr. | |
| 5,327,529 A | 7/1994 | Fults et al. | |
| 5,367,635 A | 11/1994 | Bauer et al. | |
| 5,371,852 A | 12/1994 | Attanasio et al. | |
| 5,406,502 A | 4/1995 | Haramaty et al. | |
| 5,475,857 A | 12/1995 | Dally | |
| 5,517,617 A | 5/1996 | Sathaye et al. | |
| 5,519,694 A | 5/1996 | Brewer et al. | |
| 5,519,778 A | 5/1996 | Leighton et al. | |
| 5,521,591 A | 5/1996 | Arora et al. | |
| 5,528,701 A | 6/1996 | Aref | |
| 5,581,764 A | 12/1996 | Fitzgerald et al. | |
| 5,596,742 A | 1/1997 | Agarwal et al. | |
| 5,606,665 A | 2/1997 | Yang et al. | |
| 5,611,049 A | 3/1997 | Pitts | |

(Continued)

FOREIGN PATENT DOCUMENTS

EP 0 744 850 A2 11/1996

(Continued)

OTHER PUBLICATIONS

"A Process for Selective Routing of Servlet Content to Transcoding Modules," *Research Disclosure* 422124, IBM Corporation, Jun. 1999, pp. 889-890.

(Continued)

*Primary Examiner* — Andrew Caldwell
*Assistant Examiner* — Jonathan Willis
(74) *Attorney, Agent, or Firm* — Frommer Lawrence & Haug LLP; Jamie L. Wiegand

(57) ABSTRACT

A method, system, an apparatus are directed towards selectively prefetching content over a network. A request for a content object is received. The content object may comprise a link to another content object. A cachability measure for the link may be determined based on whether a plurality of previous requests for the link returned the other content object, an annotation in a link map, a probability of traversing the link, a network metric, or the like. A prefetchability measure for the link may be determined based on the cachability measure and/or another factor relating to the link. The other factor may be an annotation of the link indicating that caching the other content object will cause a related object to be uncachable. Based on the prefetchability measure, the other content object is selectively prefetched for subsequent provisioning and/or display.

18 Claims, 9 Drawing Sheets

U.S. PATENT DOCUMENTS

| | | | |
|---|---|---|---|
| 5,663,018 | A | 9/1997 | Cummings et al. |
| 5,678,042 | A | 10/1997 | Pisello et al. |
| 5,752,023 | A | 5/1998 | Choucri et al. |
| 5,761,484 | A | 6/1998 | Agarwal et al. |
| 5,768,423 | A | 6/1998 | Aref et al. |
| 5,774,660 | A | 6/1998 | Brendel et al. |
| 5,778,395 | A | 7/1998 | Whiting et al. |
| 5,790,554 | A | 8/1998 | Pitcher et al. |
| 5,875,296 | A | 2/1999 | Shi et al. |
| 5,892,908 | A | 4/1999 | Hughes et al. |
| 5,892,914 | A | 4/1999 | Pitts |
| 5,919,247 | A | 7/1999 | Van Hoff et al. |
| 5,933,834 | A | 8/1999 | Aichelen |
| 5,936,939 | A | 8/1999 | Des Jardins et al. |
| 5,946,690 | A | 8/1999 | Pitts |
| 5,949,885 | A | 9/1999 | Leighton |
| 5,959,990 | A | 9/1999 | Frantz et al. |
| 5,974,460 | A | 10/1999 | Maddalozzo, Jr. et al. |
| 5,983,281 | A | 11/1999 | Ogle et al. |
| 5,991,306 | A | 11/1999 | Burns et al. |
| 6,006,260 | A | 12/1999 | Barrick, Jr. et al. |
| 6,006,264 | A | 12/1999 | Colby et al. |
| 6,026,452 | A | 2/2000 | Pitts |
| 6,028,857 | A | 2/2000 | Poor |
| 6,051,169 | A | 4/2000 | Brown et al. |
| 6,076,105 | A | 6/2000 | Wolff et al. |
| 6,078,956 | A | 6/2000 | Bryant et al. |
| 6,085,234 | A | 7/2000 | Pitts et al. |
| 6,092,196 | A | 7/2000 | Reiche |
| 6,098,064 | A * | 8/2000 | Pirolli et al. ............... 1/1 |
| 6,108,703 | A | 8/2000 | Leighton et al. |
| 6,111,876 | A | 8/2000 | Frantz et al. |
| 6,145,011 | A | 11/2000 | Furukawa et al. |
| 6,157,942 | A | 12/2000 | Chu et al. |
| 6,157,950 | A | 12/2000 | Krishnan |
| 6,173,293 | B1 | 1/2001 | Thekkath et al. |
| 6,182,146 | B1 | 1/2001 | Graham-Cumming, Jr. |
| 6,253,234 | B1 | 6/2001 | Hunt et al. |
| 6,298,319 | B1 | 10/2001 | Heile et al. |
| 6,324,182 | B1 | 11/2001 | Burns et al. |
| 6,324,685 | B1 | 11/2001 | Balassanian |
| 6,353,836 | B1 | 3/2002 | Bamford et al. |
| 6,374,404 | B1 | 4/2002 | Brotz et al. |
| 6,594,664 | B1 | 7/2003 | Estrada et al. |
| 6,629,138 | B1 | 9/2003 | Lambert et al. |
| 6,742,045 | B1 | 5/2004 | Albert et al. |
| 6,772,203 | B1 | 8/2004 | Feiertag et al. |
| 6,775,235 | B2 | 8/2004 | Datta et al. |
| 6,993,591 | B1 * | 1/2006 | Klemm ................. 709/232 |
| 2001/0051927 | A1 * | 12/2001 | London et al. ............. 705/51 |
| 2002/0103778 | A1 * | 8/2002 | Saxena ...................... 707/1 |
| 2002/0147895 | A1 * | 10/2002 | Glance et al. ............ 711/158 |
| 2002/0194434 | A1 * | 12/2002 | Kurasugi ................ 711/137 |
| 2003/0126232 | A1 * | 7/2003 | Mogul et al. ............. 709/219 |
| 2003/0147403 | A1 * | 8/2003 | Border et al. ........... 370/395.53 |
| 2003/0229809 | A1 | 12/2003 | Wexler et al. |
| 2004/0088375 | A1 * | 5/2004 | Sethi et al. ............. 709/218 |
| 2005/0008017 | A1 | 1/2005 | Datta et al. |
| 2006/0101341 | A1 * | 5/2006 | Kelly et al. ............ 715/738 |
| 2006/0265689 | A1 | 11/2006 | Kuznetsov et al. |
| 2008/0229071 | A1 * | 9/2008 | Shioya et al. ........... 712/207 |

FOREIGN PATENT DOCUMENTS

| | | |
|---|---|---|
| WO | WO-91/14326 A2 | 9/1991 |
| WO | WO-95/05712 A2 | 2/1995 |
| WO | WO-97/09805 A1 | 3/1997 |
| WO | WO-97/45800 | 12/1997 |
| WO | WO-99/05829 A1 | 2/1999 |
| WO | WO-99/06913 A1 | 2/1999 |
| WO | WO-99/10858 A2 | 3/1999 |
| WO | WO-99/39373 A2 | 8/1999 |
| WO | WO-99/64967 A1 | 12/1999 |
| WO | WO-00/04422 A2 | 1/2000 |
| WO | WO-00/04458 A1 | 1/2000 |

OTHER PUBLICATIONS

"Amendment to Carrier Sense Multiple Access with Collision Detection (CSMA/CD) Access Method and Physical Layer Specifications—Aggregation of Multiple Link Segments," IEEE Std. 802.3ad-2000, Mar. 30, 2000, 183 pages.

"Global-Site Content Controller Administrator Guide," *F5 Networks*, Seattle, WA, Apr. 2000, 211 pages.

"Servlet/Applet/HTML Authentication Process With Single Sign-On," *Research Disclosure* 429128, IBM Corporation, Jan. 2000, pp. 163-164.

"Transmission Control Protocol: DARPA Internet Program Protocol Specification," Information Services Institute, University of Southern California, Network Working Group, RFC 793, Sep. 1981, 91 pages.

Cohen, Edith et al. "Prefetching the Means for Document Transfer: A New Approach for Reducing Web Latency," 2000, 10 pages.

Duchamp, Dan, "Prefetching Hyperlinks," AT&T Labs—Research, 1999, 12 pages.

Hopps, C., "Analysis of an Equal-Cost Multi-Path Algorithm," Network Working Group, RFC 2992, Nov. 2000, 8 pages.

Moy, J., "OSPF Version 2," Network Working Group, RFC 2328, Apr. 1998, 53 pages.

Peterson, J., "A Privacy Mechanism For The Session Initiation Protocol (SIP)," Network Working Group, RFC 3323, Nov. 2002, 21 pages.

Thaler, D. et al., "Multipath Issues in Unicast and Multicast Next-Hop Selection," Network Working Group, RFC 2991, Nov. 2000, 9 pages.

\* cited by examiner

US 7,975,025 B1

SMART PREFETCHING OF DATA OVER A NETWORK

TECHNICAL FIELD

The present invention relates generally to network communications, and more particularly, but not exclusively, to causing a network device to selectively prefetch content over a network.

BACKGROUND

Content usage on the Internet has become an intregal part of commerce and communication. Content may be cached locally after it has been used or visited and may be provided for subsequent consumption. Content may be also be prefetched. However, uninformed prefetching may actually decrease performance or cause unwanted side effects. For example, prefetching a web page that modifies a user's information or account may produce unwanted side effects, such as deleting the user's account altogether, posting unwanted data, or the like.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the invention, which is to be read in association with the accompanying drawings, wherein.

DETAILED DESCRIPTION

Figure 1:
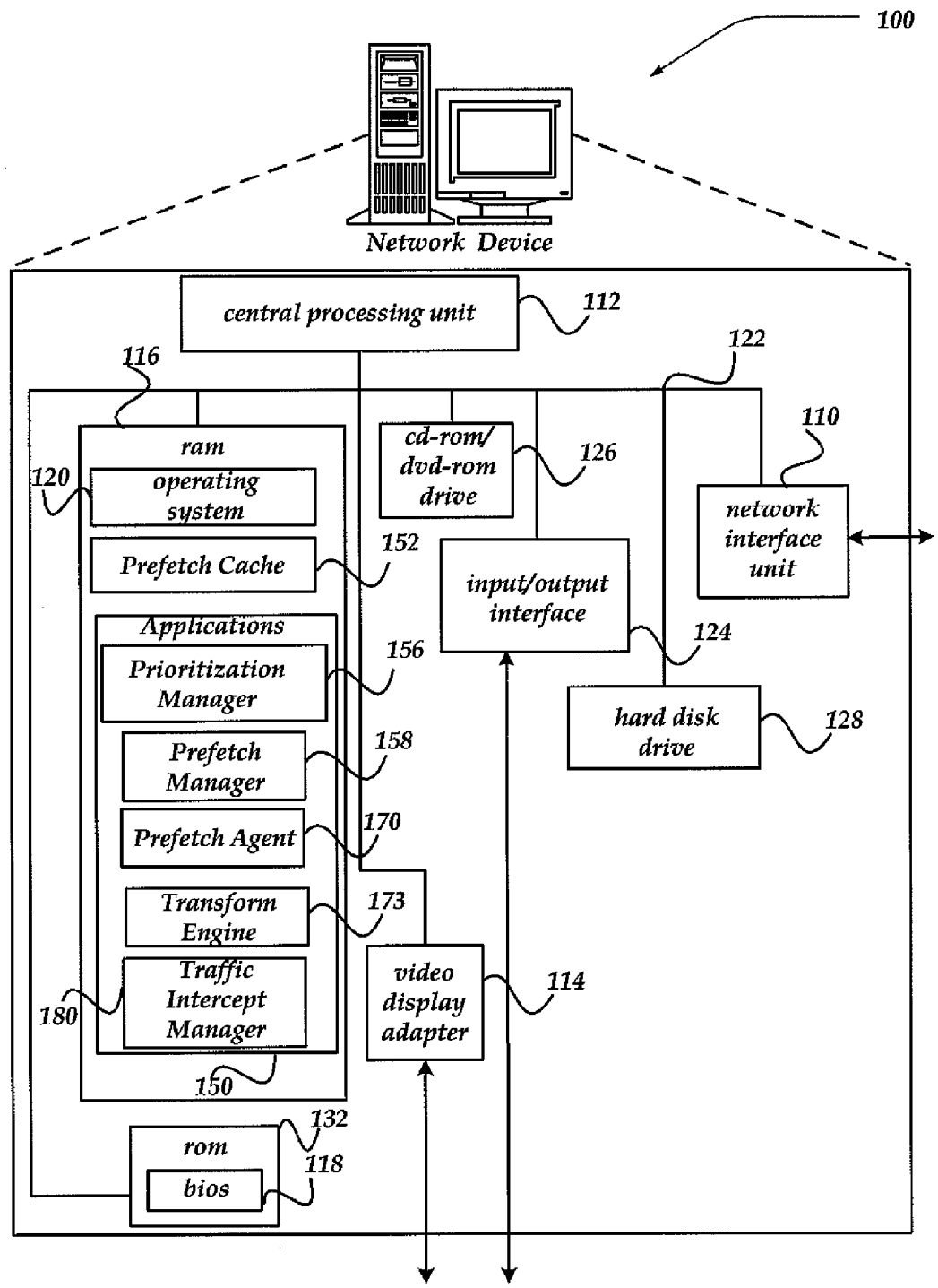
FIG. 1 illustrates one embodiment of a network device for practicing the invention.

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meanings of "a," "an," and "the" include plural references. The meaning of "in" includes "in" and "on."

As used herein, the term "content object" refers to any data in any data format, including a document object, a multimedia object, or the like, that can be accessed over a network. The content object further represents a data format that enables linking to another content object, including, but not limited to markup language document format (e.g., Hypertext Transfer Language (HTML), Extensible Markup Language (XML), Standard Generalized Markup Language (SGML), Domain Name System (DNS) entry (including responses), or even a non-markup language format (e.g., Object Linking and Embedding (OLE)), Structured Query Language (SQL), or the like.

The term "link" refers to any addressing mechanism, including a Uniformed Resource Identifier (URI), Uniformed Resource Locator (URL), or the like.

In one embodiment, a link may comprise an "explicit link" (e.g., HTTP hrefs, IMG SRC values, etc.). Explicit links may be defined using markup text for example, or other user configurable mechanisms. A link may also comprise an "implicit link" (e.g., OLE2 streams, sequential SMB block requests, etc.). Implicit links may be generated within a document object, and may represent an interconnection between data within and between objects, and may be edited using a document editing program by editing the document object. It should be noted, that links, explicit or implicit, may include a reference to another link. Thus, in one embodiment, a link may include a hierarchical set of links.

A "link map" refers to a network of links between content objects. Each link may be specified with at least one annotation. The term "prefetch" refers to retrieving data before the data is requested by a user. Typically, such prefetching of the data is from a storage device, such as a server device, or the like, for use at a client device. The data may be prefetched into a prefetch cache location that may reside in a variety of locations.

As used herein, a "tunnel" or "tunneled connection" is a network mechanism that provides for the encapsulation of network packets or frames at a same or lower layer protocol of the Open Systems Interconnection (OSI) network stack. Tunneling may be employed to take packets or frames from one network system and place (or encapsulate) them inside of packets or frames from another network system. In one embodiment, tunneling may aggregate flows (example of a flow may include a sequence of packets with a same source/destination IP address and/or port number) between two network devices and transfer them as a single flow. Examples of tunneling protocols include, but are not limited to IP tunneling, L2TP, PPP, PPTP, VPNs, IPSec, GRE, MBone, SSL and TLS.

The term "network connection" refers to a collection of links and/or software elements that enable a computing device to communicate with another computing device over a network. One such network connection may be a TCP/IP connection. TCP/IP connections are virtual connections between two network nodes, and are typically established through a TCP/IP handshake protocol. The TCP/IP protocol is described in more detail in Request for Comments (RFC)

793, and/or RFC 3323, which are available through the Internet Engineering Task Force (IETF), and are each herein incorporated by reference.

Embodiments are directed towards selectively prefetching content over a network. A request for a content object is received, and the content object may be provided. The content object may comprise a link to another content object. For example, the content object may include a URL link to an HTML document. A cachability measure for the link may be determined based on cachability criteria, including, but not limited to: whether a plurality of previous requests for the link returned the other content object, an annotation of the link in a link map, a probability of traversing the link by users of a website, a network metric, an authorization of a user requesting the link, a time to live metric, or the like. In one embodiment, the cachability measure is determined as a weighted sum of probabilities of a plurality of cachability criteria. A prefetchability measure may then be determined and/or adjusted. In one embodiment, the prefetchability measure may be determined as a weighted sum or probabilities of the cachability measure and/or another factor relating to the link. The other factor may be, but is not limited to, an annotation in the link, or another document, schema, or the like, indicating that caching the other content object will cause the other content object or a related content object to be uncachable. In this manner, while some cachability criteria might indicate a high probability that a content object is cacheable, based on other cachability criteria, and/or other prefetchability factors, the content object might not be prefetched. In any event, based on the prefetchability measure, the other content object is selectively prefetched for subsequent provisioning and/or display at the client device.

In one embodiment, an almost asymmetric web acceleration may be achieved by, for example, directing a user's web browser, or other client device application, to prefetch links by either inserting tags, such as HTML tags, JavaScript, or the like, into a server response. This approach further minimizes changes to a website's application. Moreover, such prefetching may be performed automatically, using positive security, with knowledge of websites transitions, and by applying intelligence to the prefetch actions. The invention may maintain user statistics such as how often various links are followed, or the like, and apply more intelligent, automatic prefetching, by prefetching more common links. In one embodiment, the prefetching may be further based on selecting those pages, or content objects, for which a user is authorized to access.

In another embodiment, a reverse proxy device, forward proxy device, or the like, may be employed to pre-fetch Domain Name System (DNS) entries for links in a content object. Thus, in one embodiment, a DNS entry may be a content object In this manner, DNS lookup time might be reduced for such situations, for example, as mash-up web pages, which may include content from a variety of different locations on a network.

Thus, a prefetchability measure may be determined for DNS entries based on a set of criteria. Because a DNS entry prefetch might not have a same side effect as prefetching, for example, a web object, SQL table entry, or the like, DNS prefetchability measures might be defined to be less stringent than for these other types of content objects. Moreover, because links may include a hierarchy of links, each link within the hierarchy might have associated with it different criteria for prefetchability. For example, one prefetchability measure might be employed to determine whether to prefetch a DNS entry, while another prefetchability measure might be used to determine whether to prefetch an associated object referenced by the DNS entry.

Illustrative Network Device

FIG. 1 shows one embodiment of a network device, according to one embodiment of the invention. Network device 100 may include many more or less components than those shown. The components shown, however, are sufficient to disclose an illustrative embodiment for practicing one or more embodiments of the invention. Network device 100 may represent, for example, traffic manager device (TMD) 308, and/or client device 302 of FIGS. 3, and 4-7, and/or TMD 306 of FIG. 6. One embodiment of the process performed by at least some components of network device 100 is described in more detail in conjunction with FIGS. 8-9.6.

Network device 100 includes at least one processing unit 112, video display adapter 114, and a mass memory, all in communication with each other via bus 122. The mass memory generally includes RAM 116, ROM 132, and one or more permanent mass storage devices, such as hard disk drive 128, tape drive, optical drive, and/or floppy disk drive. The mass memory stores operating system 120 for controlling the operation of network device 100.

As illustrated in FIG. 1, network device 100 also can communicate with the Internet, or some other communications network via network interface unit 110, which is constructed for use with various communication protocols including the TCP/IP protocol. Network interface unit 110 is sometimes known as a transceiver, transceiving device, or network interface card (NIC).

The mass memory 116, 126, 128, and 132 described herein and shown in FIG. 1 illustrate another type of computer-readable media, namely computer readable or processor readable storage media, which are examples of machine-readable storage media. Computer readable storage/machine-readable storage media may include volatile, nonvolatile, removable, and non-removable media implemented in any method or technology for storage of information, such as computer readable/machine-executable instructions, data structures, program modules, or other data, which may be obtained and/or executed by at least one processing unit 112 to perform one or more portions of process 800-900 FIGS. 8-9, for example. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing device.

The mass memory may also store other types of program code and data as applications 150, which may be loaded into mass memory and run on operating system 120. Examples of application 150 may include web browser, email client/server programs, routing programs, schedulers, web servers, calendars, database programs, word processing programs, Hyper Text Transfer Protocol (HTTP) programs, Real-Time Streaming Protocol (RTSP) programs, security programs, and any other type of application program.

Network device 100 may also include a Simple Mail Transfer Protocol (SMTP) handler application for transmitting and receiving e-mail, an HTTP handler application for receiving and handing HTTP requests, an RTSP handler application for receiving and handing RTSP requests, and an HTTPS handler application for handling secure connections. The HTTPS handler application may initiate communication with an external application in a secure fashion. Moreover, network device 100 may further include applications that support virtually any secure connection, including TLS, TTLS, EAP, SSL, IPSec, and the like.

Network device 100 may also include input/output interface 124 for communicating with external devices, such as a mouse, keyboard, scanner, or other input/output devices not shown in FIG. 1. Likewise, network device 100 may further include additional mass storage facilities such as cd-rom/dvd-rom drive 126 and hard disk drive 128. Hard disk drive 128 may be utilized to store, among other things, application programs, databases, and the like in the same manner as the other mass memory components described above.

In one embodiment, the network device 100 may include at least one Application Specific Integrated Circuit (ASIC) chip (not shown) coupled to bus 122. The ASIC chip can include logic that performs some or all of the actions of network device 100. For example, in one embodiment, the ASIC chip can perform a number of packet processing functions for incoming and/or outgoing packets.

In one embodiment, network device 100 can further include one or more field-programmable gate arrays (FPGA) (not shown), instead of, or in addition to, the ASIC chip. A number of functions of network device 100 can be performed by the ASIC chip, the FPGA, by CPU 112 with instructions stored in memory, or by any combination of the ASIC chip, FPGA, and a CPU.

In one embodiment, ram 116 may include prefetch cache 152; however, prefetch cache 152 may also reside completely, or in part, in another mass memory storage media, including, but not limited to a storage device readable by cd-rom/dvd-rom drive 126, on hard disk drive 128, or even on a computer readable storage medium on another network device and possibly accessible by network device 100 through network interface unit 110.

Prefetch cache 152 may include virtually any mechanism configured and arranged to store data and/or computer readable instructions. Prefetch cache 152 may be a hash table, lookup table, hardware accelerated index, or the like. Prefetch cache 152 may be an in-memory cache within memory space of a web browser, a database, or the like. Prefetch cache 152 may index data by an address, a link, an identifier, or the like. In one embodiment, the data may comprise instructions which when executed may generate content object(s). In another embodiment, the data may comprise content object(s). The data, instructions, and/or content object(s) may be provided to one of applications 150 or over network interface unit 110.

Prioritization manager 156 includes any component configured to prioritize at least one request for data (e.g., a content object) over network interface unit 110. Such requests may include prefetch requests. In one embodiment, prioritization manager 156 may be configured to employ various mechanisms to prioritize requests for content objects based on any of a variety of criteria.

For example, prioritization may be based on a prefetchability measure, where higher prefetchability measures might receive higher priorities, although the invention is not limited to this criterion, and others may be used, without departing from the scope of the invention.

Prioritization manager 156 may include a priority queue. A priority for a prefetch request may be determined by prioritization manager 156. A prefetch request with a higher priority may be placed higher in the priority queue. An item at the top of the queue may be serviced by sending the prefetch request over network interface unit 110. In one embodiment, prioritization manager 156 may also receive the prefetch request and may select and provide the prefetch request to a backend server based on any of a plurality of load-balancing metrics, including network traffic, network topology, capacity of a server, characteristic of the request, a round-robin metric, a domain name requested, or the like. The prefetch request may be load-balanced over network interface unit 110. In one embodiment, prioritization manager 156 may comprise at least two components: a component to prioritize responses, and a component to prioritize prefetches requests. It is noted that prioritization manager 156 may also prioritize and manage non-prefetch requests as well.

Prefetch manager 158 includes any component for selectively prefetching content. In one embodiment, prefetch manager 158 may be a script executing within a client browser. In another embodiment, prefetch manager 158 may be a separate program, a part of an operating system, or the like. Prefetch manager 158 may receive a request for a content object, which may include at least one link, over network interface unit 110. Another content object associated with the link may be parsed. A cachability measure and a prefetchability measure may be determined for the link. Prefetch manager 158 may use a link map stored, for example, in hard disk drive 128, a rule manager, or the like, to determine the prefetchability measure. Based on the determined prefetchability measure, a request to prefetch the other content object may be sent to the prefetch cache 152 over network interface unit 110. If the content object is not in prefetch cache 152, the request may be sent over network interface unit 110 and/or sent to prioritization manager 156 for further processing.

Prefetch agent 170 includes any component for formatting a request into an appropriate format for sending to another device over network interface unit 110. Prefetch agent 170 may convert a request into an appropriate network protocol, such as HTTP, HTTPS, or the like.

Transform engine 173 includes any component for modifying data sent over network interface unit 110. Transform engine 173 may add, modify, or remove content from the sent data; add, modify, or remove header information of the sent information; or the like. Transform engine 173 may insert JavaScript code or other markup text into content before the content is sent over network interface unit 110.

Traffic intercept manager 180 includes any component for intercepting data and requests sent to or received from network interface unit 110. A request may be a function call, a library call, an API call, a packet request over a network, or the like. Traffic intercept manager 180 may be enabled as an interjected DLL within an operating system or even client application 181. Traffic intercept manager 180 may exist on client, proxy, or server devices. Traffic intercept manager 180 may intercept a request for a content object, and may send the request to prefetch manager 158 for further processing, instead of sending the request directly to the operating system.

While network device 100 is shown to include prefetch cache 152, prioritization manager 156, prefetch manager 158, prefetch agent 170, transform engine 173, and traffic intercept manager 180, in alternate embodiments, at least some of these components may not be included and may be optional, and/or alternate or other components may be included. Alternate embodiments of arrangements of these components are described in more detail in conjunction with FIGS. 4-7.

Figure 2:
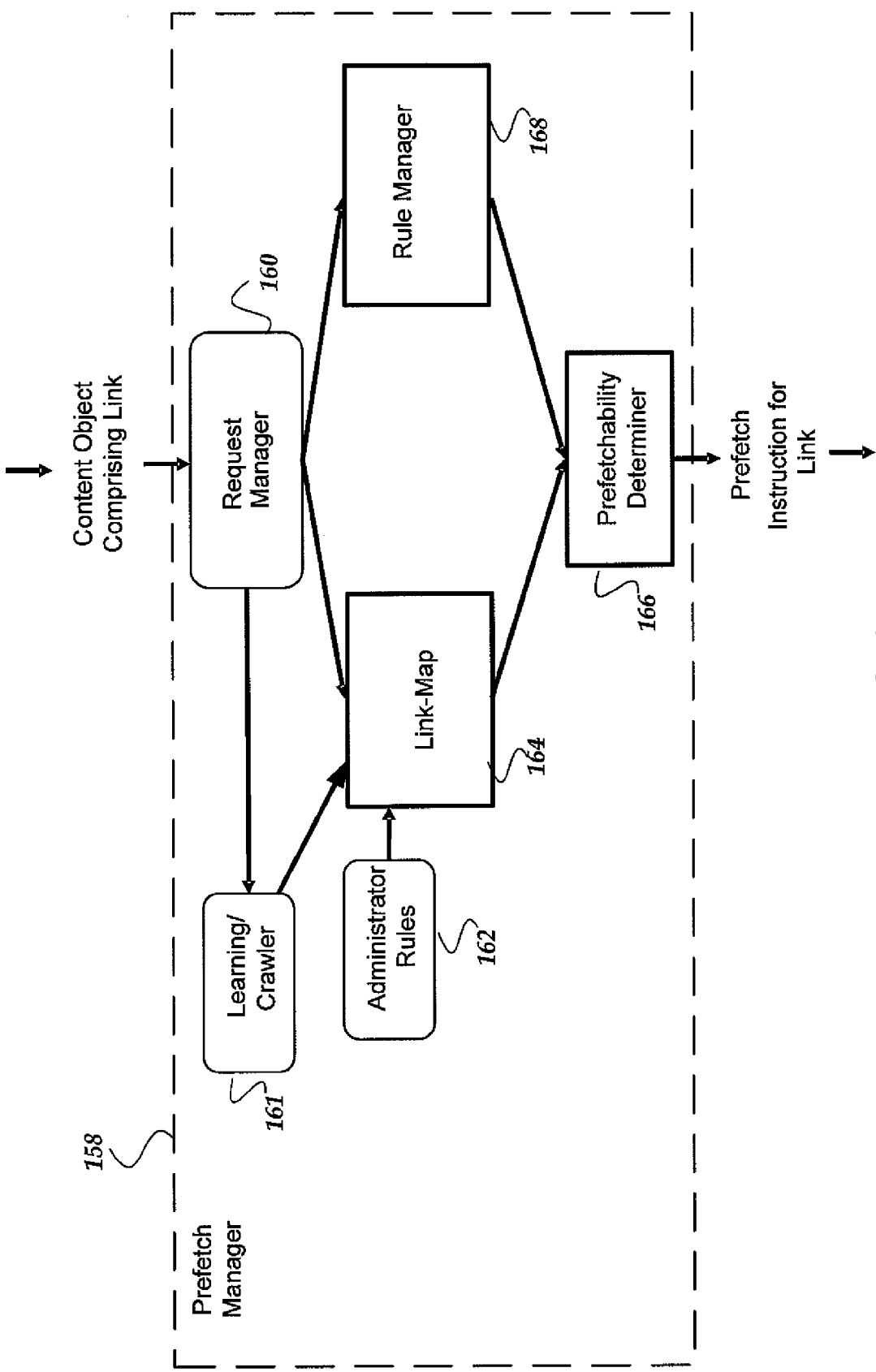
FIG. 2 illustrates one embodiment of a prefetch manager.

FIG. 2 shows one embodiment of prefetch manager 158 of FIG. 1. As shown, prefetch manager 158 comprises a request manager 160, a learning/crawler module 161, an administrator rules module 162, a link map 164, a rule manager 168, and a prefetchability determiner 166. The operations of prefetch manager 158 are described in more detail in conjunction with FIGS. 8-9. Briefly, request manager 160 may receive a request for a content object, wherein the content object may comprise at least one link to another content object. The request and/or link(s) may be sent to link map 164 and/or rule manager 168.

Link map 164 may store a plurality of annotations of the cachability of the link/other content object. An annotation is any data, information, or attribute that is associated with a link. An administrator may be enabled to annotate the links using, for example, administrator rules module 162. For example, an administrator may use a user interface to annotate an attribute field of that link to indicate a probability of cachability for the link. In another embodiment, the annotation may be set or modified with an automatic annotation, such as through a crawler of a website, or the like. For example, learning/crawler module 161 may crawl a plurality of web pages and/or may observe a use of a plurality of web pages. In one embodiment, learning/crawler module 161 may observe the request(s) from request manager 160. Based on the observation and/or crawling and a (conditional) probability of link traversals, the annotations in the link map may be set or modified with the probability. Link map 164 may provide a cachability measure based on the annotations.

Rule manager 168 may manage a plurality of rules operating on network metrics. The rules may be based on network metric, user authorization, an attribute of the link to the content object, or any other measure. Based on these measures, rule manager 168 may block traffic (e.g., enable a firewall), check if a predicted request would be allowed or denied, or the like. In one embodiment, based on these measures, rule manager 168 may provide a cachability measure for the link. The cachability measure may be specific to a connection and/or a user.

An example of a rule may be of the form: IF (bandwidth<threshold AND user_type !=guest) OR link is a HTTP-GET THEN cachability_measure+=0.1. In this example, the Boolean expression tests whether the bandwidth is lower than a threshold and a type of the user is not a "guest" or the link is an HTTP-GET request. If the Boolean expression is true, the cachability measure may be increased by 30%. Other Boolean expressions may be used and/or other actions for modifying and/or determining the cachability measure may be used without departing from the scope of the invention. The above example is not intended to be exhaustive, but merely to illustrate one possible use of rules for managing prefetching of content. Moreover, it should be understood, that such rules may be constructed using any of a variety of editing tools, and provided to rules manager 168 by an administrator or the like, "virtually on the fly," thereby providing a mechanism for dynamically managing changes in cache management.

Prefetchability determiner 166 may determine whether to prefetch the other content object based on a plurality of cachability measures received from link map 164 and/or rule manager 168. The plurality of cachability measures may be combined to generate a combined cachability measure. The combined cachability measure may be combined with another factor relating to the other content object or link to generate a prefetchability measure. Prefetchability determiner 166 may determine the prefetchability measure based on the cachability measure and/or another factor relating to the link.

Prefetchability determiner 166 may output at least one instruction for prefetching the link based on the prefetchability measure and/or the identity of the content object, the link, and/or the other content object. The instruction may also comprise an indication of whether to prefetch the link or not, the prefetchability measure for determining a probability of the link being cachable and/or prefetchable, a location for prefetching the link, or the like.

It should be noted, that although the above components are illustrated as distinct components, the invention is not so constrained. Thus, one or more of the above described components may be combined. Moreover, not all of these components may be required to practice the invention, and variations in the arrangement of the components may be made without departing from the scope of the invention.

Illustrative Operating Environment

Figure 3:
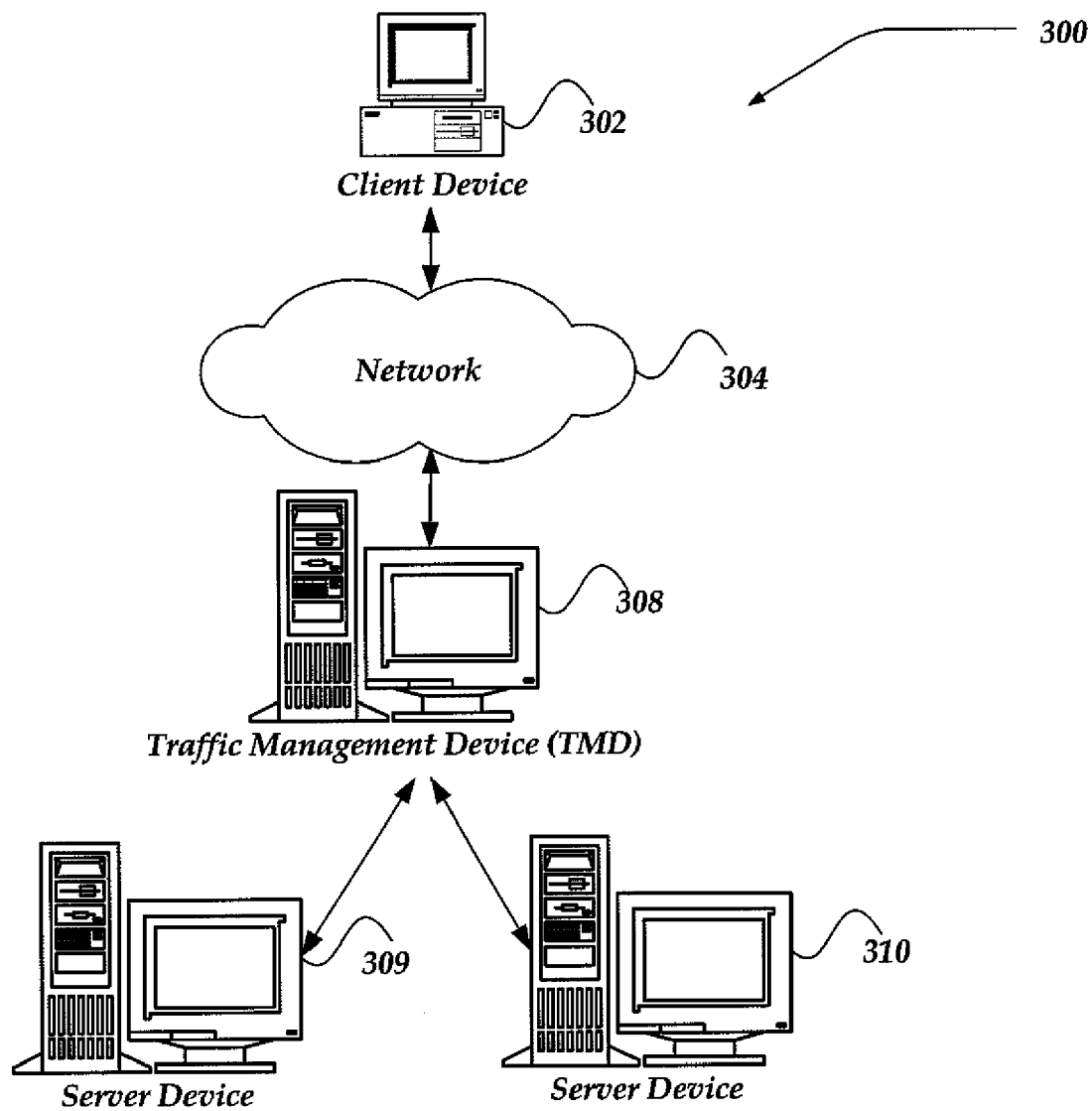
FIG. 3 shows a block diagram illustrating one environment for practicing the invention.

FIG. 3 illustrates one embodiment of an environment in which the invention may operate. However, not all of these components may be required to practice the invention, and variations in the arrangement and type of the components may be made without departing from the spirit or scope of the invention.

As shown in the figure, system 300 includes client device 302, Traffic Manager Device (TMD) 308, server devices 309-310, and network 304. TMD 308 is in communication with server devices 309-110, and through network 304 with client device 302. Although not illustrated, a network similar to network 304 may reside between TMD 308 and server devices 309-110.

One embodiment of a possible client device is described in more detail in conjunction with FIG. 1. Generally, however, client device 302 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 302 may also include other computing devices, such as personal computers, multiprocessor systems, microprocessor-based or programmable consumer electronics, network devices, and the like. As such, client device 302 may range widely in terms of capabilities and features. For example, a client device configured as a cell phone may have a numeric keypad and a few lines of monochrome LCD display on which only text may be displayed.

Client device 302 also may include at least one client application that is configured to receive content from another computing device. The client application may include a capability to provide and receive textual content, graphical content, audio content, alerts, messages, and the like. Moreover, client device 302 may be further configured to communicate a message, such as through a Short Message Service (SMS), Multimedia Message Service (MMS), instant messaging (IM), internet relay chat (IRC), mIRC, Jabber, and the like, between another computing device, and the like.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

In one embodiment, client device 302 may be configured such that an end-user may make requests for data and/or services from other computers on the network. Client device 302 may send a request to one of server devices 309-110 for a content object comprising a link to another content object. The request may be sent over network 304 and/or TMD 308.

In one embodiment, client device 302 may be configured to prefetch the other content object based on the link. A cachability measure for the link and an associated prefetchability measure for the link may be determined. If the prefetchability measure indicates prefetching, client device 302 may send a request to server devices 309-110 for the other content object. The prefetched other content object may be provided by client device 302 based on subsequent requests for the other content object. In one embodiment, client device 302 may employ a process substantially similar to that described in conjunction with FIGS. 8-9 to perform at least some of its actions. FIG. 5 shows another embodiment of selective prefetching performed using a client device 302. It should be noted however, that in other embodiments, other devices may be configured to selectively prefetch the other content object. For example, shown in FIG. 4, a TMD may be configured to perform selective prefetch, while FIG. 6 illustrates selective prefetching performed using a data center appliance (not shown in FIG. 3).

Network 304 is configured to couple one computing device with another computing device. Network 304 may be enabled to employ any form of computer readable media for communicating information from one electronic device to another. Also, network 304 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone line.

Network 304 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 304 may also include an autonomous system of terminals, gateways, routers, and the like connected by wireless radio links, and the like. These connectors may be configured to move freely and randomly and organize themselves arbitrarily, such that the topology of network 304 may change rapidly.

Network 304 may further employ a plurality of access technologies including 2nd (2G), 1.5, 3rd (3G), 4th (4G) generation radio access for cellular systems, WLAN, Wireless Router (WR) mesh, and the like. Access technologies such as 1G, 3G, and future access networks may enable wide area coverage for mobile devices with various degrees of mobility. For example, network 304 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 304 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of TMD 308 is described in more detail in conjunction with FIG. 1. Briefly, however, in one embodiment, TMD 308 may include virtually any device that manages network traffic. Such devices include, for example, routers, proxies, firewalls, load balancers, cache devices, devices that perform network address translation, any combination of the preceding devices, and the like. TMD 308 may, for example, control the flow of data packets delivered to and forwarded from an array of servers, such as server devices 309-110. TMD 308 may direct a request to a particular server based on network traffic, network topology, capacity of a server, content requested, and a host of other traffic distribution mechanisms. TMD 308 may receive data packets from and transmit data packets to the Internet, an intranet, or a local area network accessible through another network. TMD 308 may recognize packets that are part of the same communication, flow, and/or stream and may perform special processing on such packets, such as directing them to the same server so that state information is maintained. TMD 308 also may support a wide variety of network applications such as web browsing, email, telephony, streaming multimedia and other traffic that is sent in packets. The BIG-IP® family of traffic managers, by F5 Networks Inc. of Seattle, Wash., are one example of TMDs. Moreover, TMDs are described in more detail in U.S. Pat. No. 7,102,996 to Amdahl, et al. entitled "Method and System for Scaling Network Traffic Managers," which is incorporated herein by reference.

In one embodiment, TMD 308 may receive over network 304 a request for a content object comprising a link to another content object. TMD 308 may process the request, by, for example, retrieving the content object from server devices 309-110. In one embodiment, the request and/or receiving of the content object may be performed through a tunnel. A cachability measure for the link may be determined based on, among other things, whether the content object associated with the link may be cached in a first place without hindering network performance or producing any unwanted side effects based on current network conditions or other established rules, an annotation of a link in a link map, a probability of the link being used, a network metric, a rule, an authorization of a user to use the link, or the like. Examples of rules operating on network metrics are described in more detail in U.S. patent application Ser. No. 11/258,551 entitled "Rule Based Extensible Authentication" to Hughes, et al., which is incorporated herein by reference.

A prefetchability measure for the link may be determined and/or based on the cachability measure. If the prefetchability measure indicates prefetching, TMD 308 may send a request to server devices 309-110 for the other content object. The prefetched other content object may be provided by TMD 308 based on subsequent requests for the other content object. In another embodiment, TMD 308 may send a prefetch command to a prefetch cache, on for example, client device 302, to prefetch and manage the other content object/link. In one embodiment, TMD 308 may employ a process substantially similar to that described in conjunction with FIGS. 8-9 to perform at least some of its actions.

Server devices 309-110 may include any device configured to communicate data over a network. Server devices 309-110 may receive a request from client device 302 over network 304 and/or through TMD 308. Server devices 309-110 may host a least one information service, including a web service, a web site, or the like. In response to the request, server devices 309-110 may reply with information including, for example, a content object, over network 304 and/or through TMD 308.

Devices that may operate as TMD 308, and/or server devices 309-110 include, but are not limited to, personal computers, desktop computers, multiprocessor systems, microprocessor-based or programmable consumer electronics, network PCs, servers, or the like.

Figure 4:
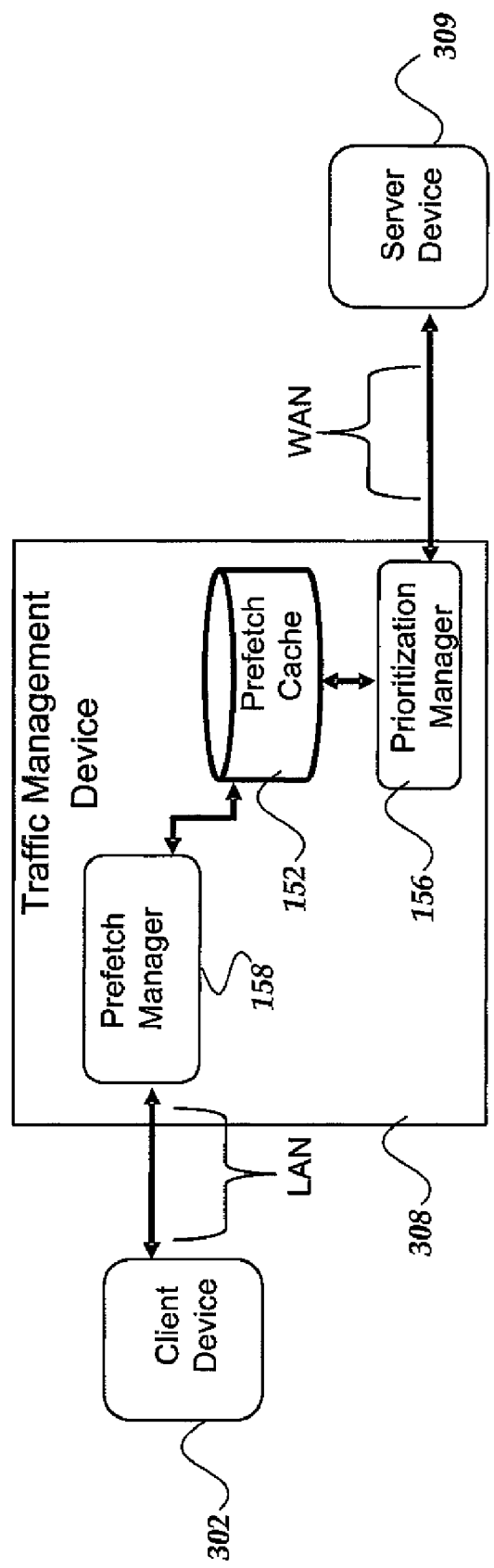
FIGS. 4-7 show block diagram illustrating alternative environments for practicing the invention.
Figure 5:
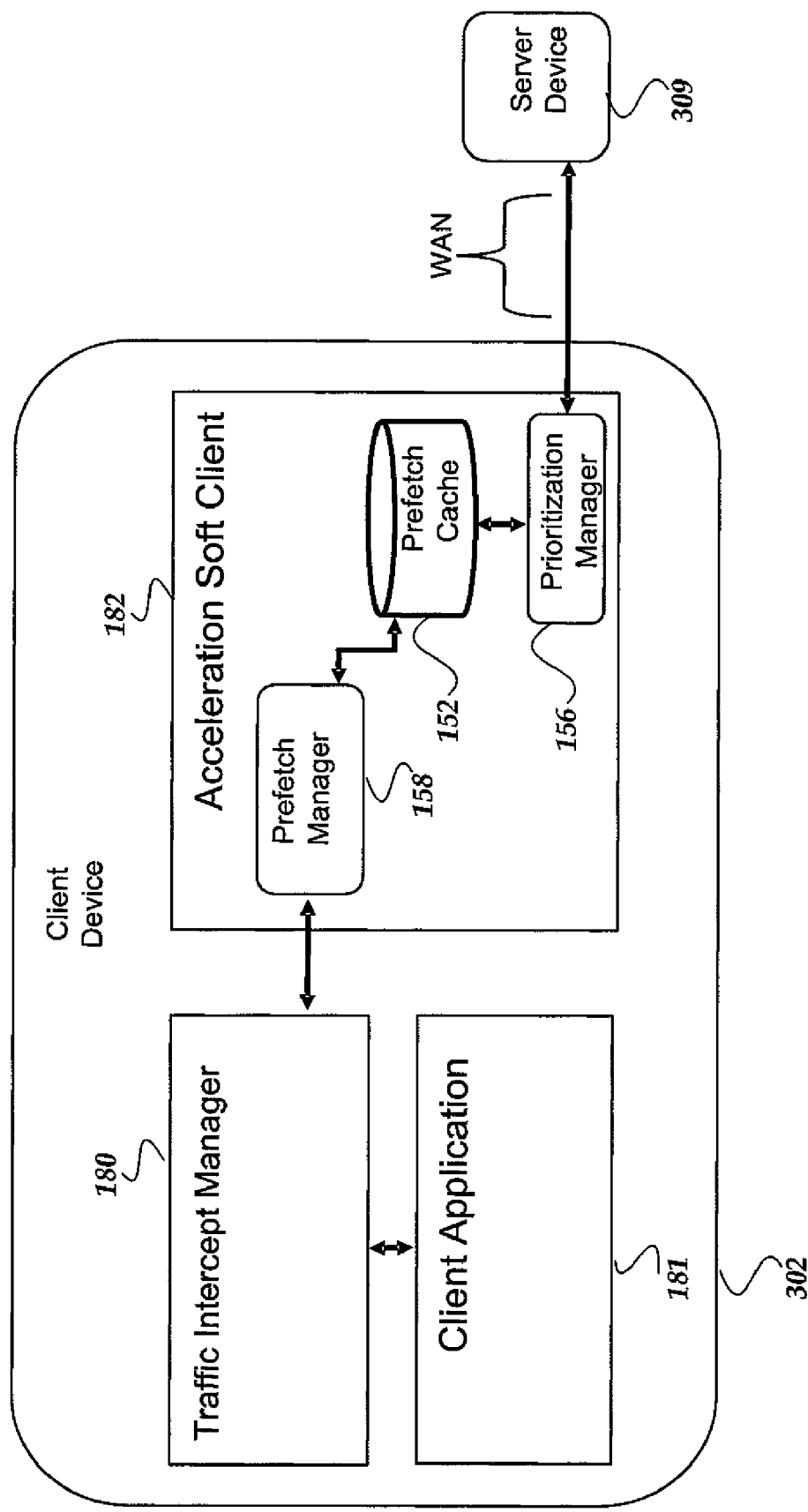
Figure 6:
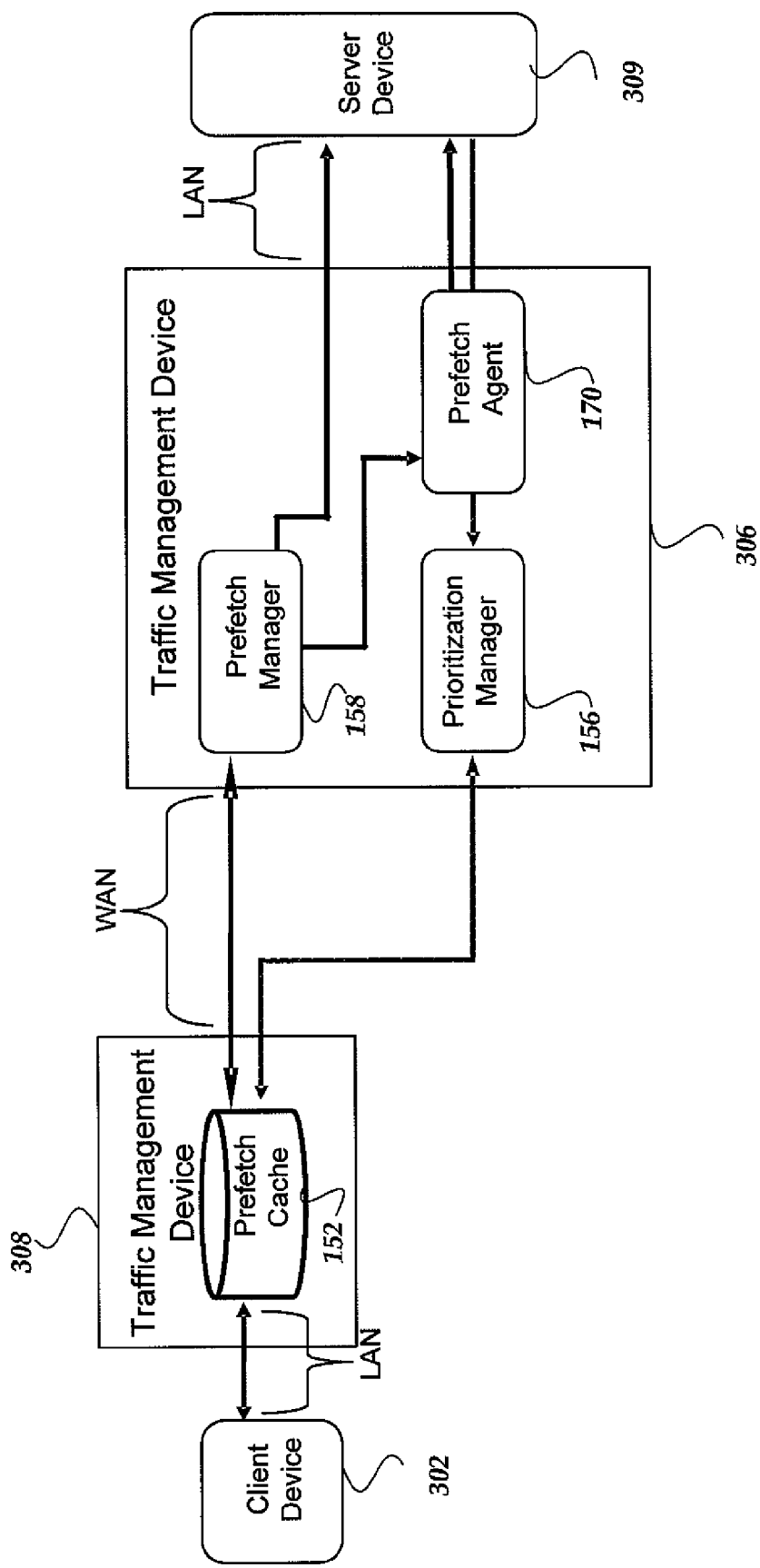

FIGS. 4-7 show alternate embodiments of system 300 and alternate arrangements of components within the devices shown. FIG. 4 shows one configuration of a system for prefetching content. Similar to FIG. 3, FIG. 4 includes client device 302, TMD 308, and server device 309. As shown, TMD 308 may be in communication with client device 302 over a LAN, and TMD 308 may be in communication with server device 309 over a WAN. However, any network configuration may be used without departing from the scope of the invention.

As shown, TMD 308 includes prefetch manager 158, prefetch cache 152, and prioritization manager 156. The operation of TMD 308 is described in more detail in conjunction with FIGS. 8-9. While the connection between client device 302 and TMD 308 is shown as a LAN, and the connection between TMD 308 and server device 309 is shown as a WAN, any network configuration may be used without departing from the scope of the invention. In one embodiment, at least one of the connections may be a tunnel.

Prefetch manager 158 includes any component for determining whether to prefetch a content object based on a prefetchability of a link to the content object. Prefetch manager 158 is described in more detail in conjunction with FIGS. 1-3. Briefly, prefetch manager 158 sends a prefetch instruction (comprising a prefetchability measure) to prefetch cache 152. Prefetch cache 152 includes any component for caching data, including a hash table, lookup table, or the like. Prefetch cache 152 sends a request to prefetch the content object to prioritization manager 156. Prioritization manager 156 may comprise a priority queue (e.g., sorted by priority) and may send a prefetch request on the top of the queue (with the highest priority) to server device 309. In response, the requested content object is received at TMD 308 and cached in prefetch cache 152.

FIG. 5 shows an alternate configuration of a system for prefetching content with yet another possible distribution of selective prefetching components of FIGS. 1-3. Similar to FIG. 3, FIG. 5 includes client device 302 and server device 309. Unlike FIG. 4, in FIG. 5, selective prefetching is performed on client device 302. As shown, client device 302 includes traffic intercept manager 180, client application 181, and acceleration soft client 182. In one embodiment, while the connection between client device 302 and server device 309 is shown as a WAN, any network configuration may be used without departing from the scope of the invention. In one embodiment, the connection may be a tunnel.

Client application 181 includes any communication applications operating on client device 302, including a messaging application, email application, browser, or the like. Client application 181 may send or receive data, including requests for content and responses. Client application 181 may send a request for a content object comprising a link to another content object. In one embodiment, the connection between client device 302 and server device 309 may be a WAN, but the connection may be any network configuration without departing from the scope of the invention.

Acceleration soft client 182 includes any component for selectively prefetching the other content object. As shown, acceleration soft client 182 includes prefetch manager 158, prefetch cache 152, and prioritization manager 156. Client application 181 may send a request for content using, for example, and operating system call. Traffic intercept manager 180 may intercept the request and instead of sending the request through the operating system directly, may further process the request. Traffic intercept manager 180 sends the request to prefetch manager 158. A determined prefetchability measure is sent to prefetch cache 152. Based on the determined prefetchability measure and/or a priority, the other content object is requested from server device 309 by prioritization manager 156. The received other content object is stored in prefetch cache 152 for subsequent consumption.

FIG. 6 shows an alternate configuration of a system for prefetching content. Unlike FIGS. 4-5, in FIG. 6, selective prefetching is performed on a data center device, and caching is performed on a TMD. TMD 306 represents virtually any computing device configured to manage communication, aggregate services, such as from server devices 309, load-balance services, or the like. TMD 306 may operate substantially similarly to TMD 308. Typically, TMD 306 might be configured to operate within an Intranet, or the like. As shown, TMD 306 includes prefetch manager 158, prioritization manager 156, and prefetch agent 170. Prefetch manager 158 may send a prefetch command to prefetch a content object to prefetch cache 152 on TMD 308. If the content object is not cached in prefetch cache 152, prefetch cache 152 sends a request to prefetch to prioritization manager 156. Prioritization manager 156 may send the request, based on a priority, to prefetch agent 170. Prefetch agent 170 may process the request into an appropriate format for sending to server device 309. For example, prefetch agent 170 may send an HTTP-GET request.

Figure 7:
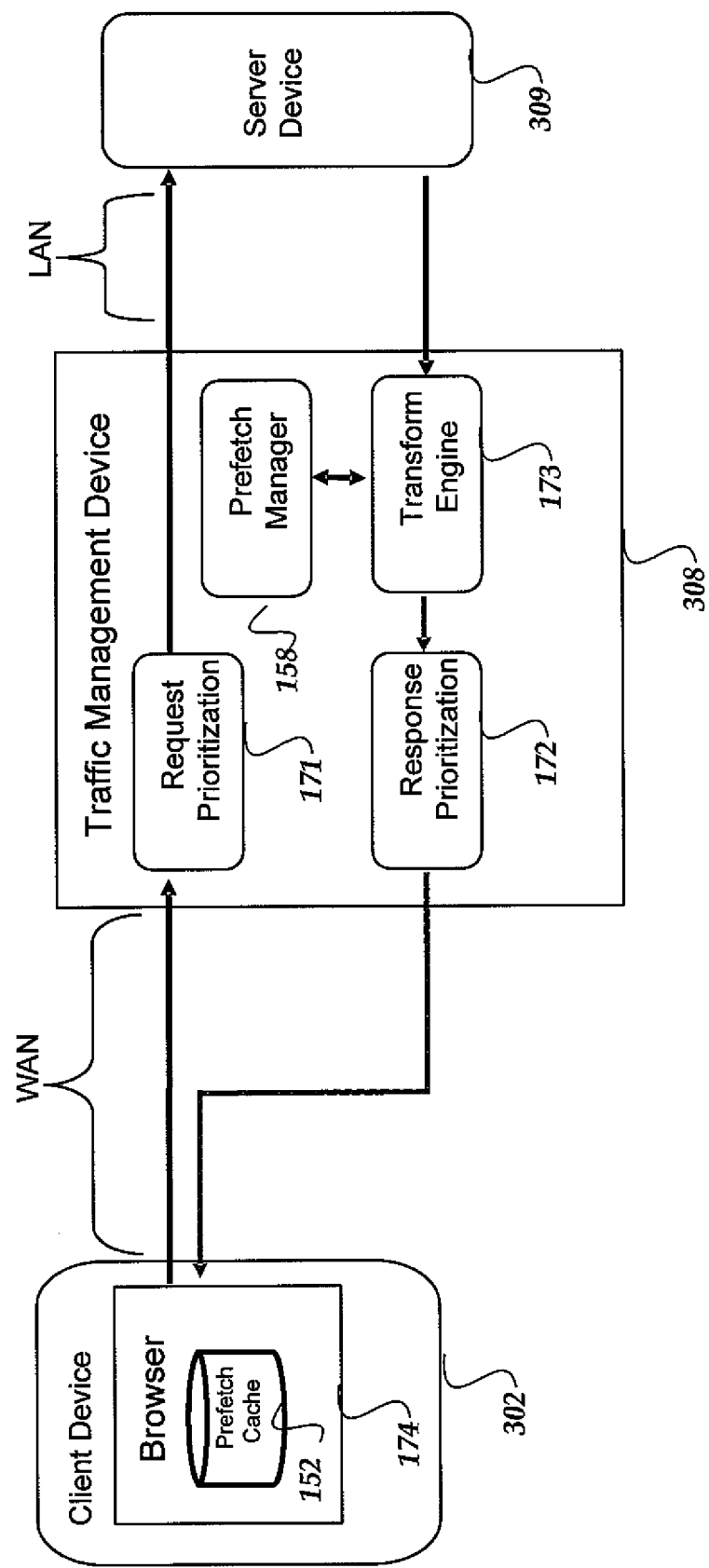

FIG. 7 shows an alternate configuration of a system for prefetching content. Unlike FIGS. 4-6, in FIG. 7, selective prefetching is performed on a TMD, and caching is performed on a client device. As shown, client device 302 includes browser 174. Browser 174 includes prefetch cache 152. Browser 174 includes any component for displaying web pages and for sending and receiving data. Browser 174 may send a request for a content object comprising a link to another content object. Prefetch cache 152 may be an in memory cache within the memory space of browser 174.

TMD 308 includes request prioritization component 171, response prioritization component 172, prefetch manager 158, and transform engine 173. Request prioritization component 171 may receive the request for a content object, queue the request based on a prioritization, and send to server device 309.

Transform engine 173 may receive the content object, parse the content object for the link, or the like. Prefetch manager 158 may also receive the content object and/or links of the content object through the transform engine 173. Prefetch manager 158 may determine a prefetchability measure. Based on the prefetchability measure, it may be determined that the other content object should be prefetched by browser 174. The content object may be transformed to indicate that the other content object should be prefetched. In one embodiment, an application, command, software, JavaScript, or other data may be inserted within the content object and/or within a protocol header for the content object (e.g., within a cookie). For example, a received HTML page may be modified to include a JavaScript code that causes prefetching of a least another content object referenced by a link within the HTML page.

The inserted data may be executed on browser 174 to prefetch the other content object. In one embodiment, the inserted data may be a JavaScript that enables an Asynchronous JavaScript and XML (AJAX) call to server device 309 through TMD 308 for the other content object. The other content object is stored in prefetch cache 152 of the browser 174 for further use by browser 174.

Generalized Operation

The operation of certain aspects of the invention will now be described with respect to FIGS. 8-9. Processes of FIGS. 8-9 may be implemented, in one embodiment, within at least some components of FIGS. 1-2 and/or TMD 308, and/or client device 302 of FIGS. 3-7.

Figure 8:
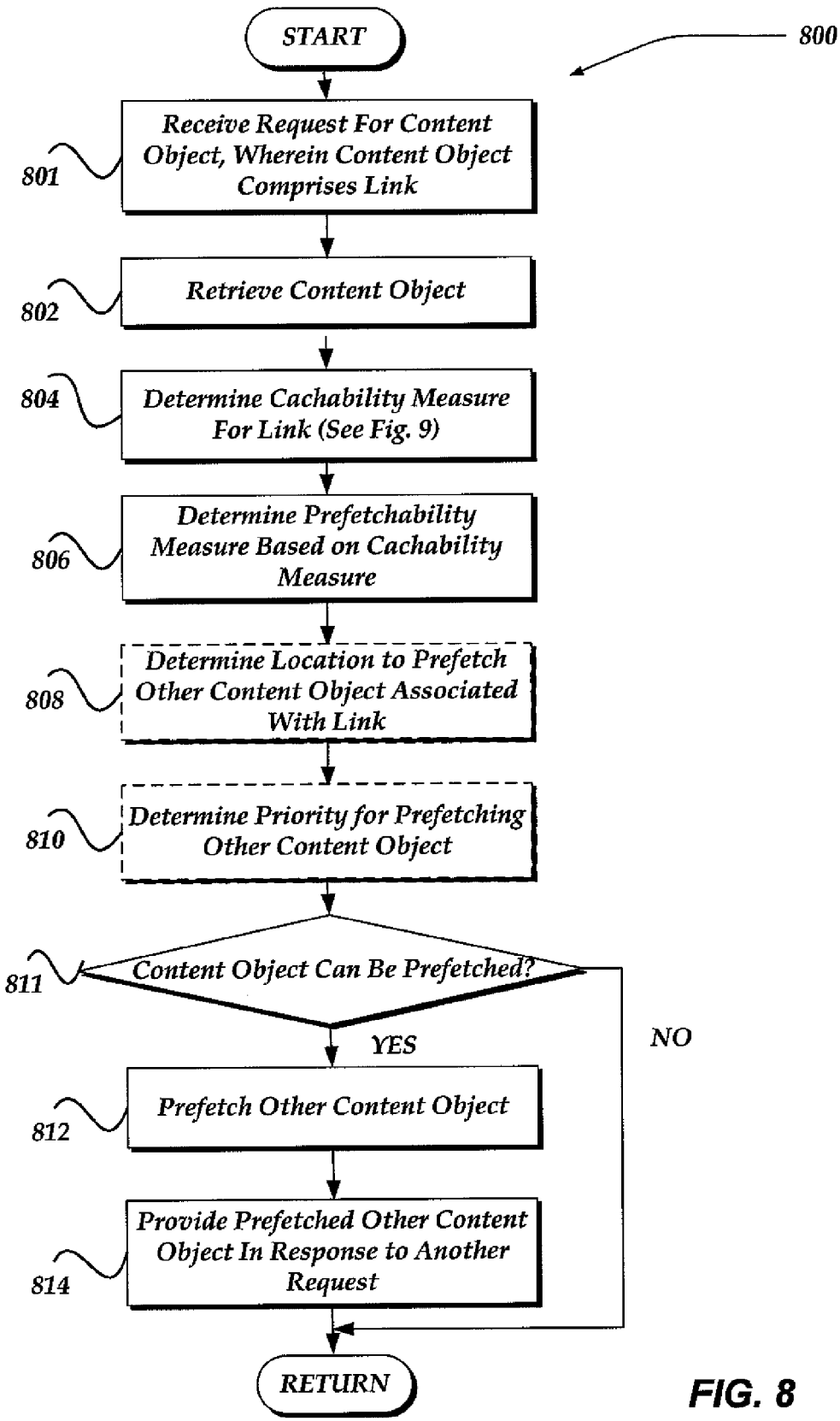
FIG. 8 illustrates a logical flow diagram generally showing one embodiment of a process for prefetching content.

FIG. 8 illustrates a logical flow diagram generally showing one embodiment of a process for prefetching content. Process 800 begins, after a start block, at block 801, where a request for a content object is received. In one embodiment, the request may be received over a network, using a network protocol, such as an HTTP request (e.g., GET, PUT, POST commands), or the like. In another embodiment, the request may be through an API, or the like. In one embodiment, on the client device, a request call of an operating system and/or of an application interface is intercepted. The request call may be for the content object.

At block 802, the content object is retrieved. In one embodiment, the content object may be retrieved based on the request. In one embodiment, the request may be forwarded from a TMD to a server for processing. The server may provide the content object in response to the request. The content object may comprise at least one link to another content object. In one embodiment, the content object may be parsed for the link to the other content object. The content object may be parsed into an internal representation, such as a Document Object Model (DOM).

At block 804, a cachability measure for the link may be determined. The cachability measure may comprise at least one value, number, or the like. In one embodiment, the cachability measure may be a Boolean value (True or False). In another embodiment, the cachability measure may be a real value representing the probability that the other content object may be cacheable. Block 804 may be performed by process 900 of FIG. 9. Briefly, in one embodiment, the cachability measure may be based in part on a plurality of different cachability criteria for the link. For example, the cachability might be determined as a weighted sum of probabilities for the plurality of different cachability criteria described in process 900. Thus, in one embodiment, the cachability measure might be based on whether a plurality of previous (historical) requests for the link returned the other content object. That is, if multiple requests for an object are responded to with copies of the same content object, then the content object may be cachable. The cachability measure may also be based on a type of the link, such as a link to a multimedia file, a link to web service with parameters, a link to a secure web site, a link to a text file, or the like. Such cachability criteria may then provide a probability of cachability, a Boolean value, or the like, that may then be combined to generate a cachability measure. In one embodiment, the probabilities, Boolean values, or the like, may be normalized. It is noted that the invention is not limited to the cachability criteria described in process 900, and others may also be included, without departing from the scope of the invention. In any event, upon determining a cachability measure, processing then continues to block 806.

At block 806, a prefetchability measure for the link is determined based on the cachability measure for the link, and at least one other factor. In one embodiment, the prefetchability measure may be a real number value representing the probability that the other content object may be prefetchable. In one embodiment, the prefetchability measure may be a combination of a plurality of cachability criteria. The combination may be a product, a weighted sum, or the like. In one embodiment, the prefetchability measure may also be based on an annotation of the link that indicates that caching the other content object will cause a related object to be uncachable. If caching the object causes another related object to be uncachable or even uncached, then the prefetchability measure may be modified to indicate a lower probability of prefetchability or even no prefetchability. Processing then continues to block 808.

At block 808, a location for prefetching the other content object is determined. In one embodiment, block 808 is optional and may not be performed. In one embodiment, a caching behavior of the client device may be determined. In one embodiment, a browser on a client may send a request using a cache-request message. In one embodiment, based on the cache-request message, it may be determined that the location for prefetching is the client/browser. In another embodiment, per-user information, such as a user profile page, may be determined to be prefetchable on the client (e.g., client's browser). In another embodiment, if the client is a non-secured client, a public client, associated with a non-secure IP address (such as a Kiosk browser), or the like, the location to prefetch may be determined to be a TMD, a device within a firewall, or the like. In one embodiment, an authorization of the client device requesting the link may be used to determine the location. For example, an administrator client device with a secured level of authorization may be configured to have prefetching performed on the administrator client device. Based on the determined caching behavior, the prefetching may be configured to occur either on the client device or on a remote device interposed between the client device and a server device configured to provide the other content object. Processing then continues to block 810.

At block 810, a priority for prefetching the other content object may be determined. In one embodiment, block 810 is optional and may not be performed. The priority may be based on the prefetchability measure. In one embodiment, the priority may be proportional to the prefetchability measure. For example, as the probability of prefetchability embodied in the prefetchability increases, the priority for prefetching the other content increases. In one embodiment, the priority of an actual client request may be given a higher priority than a predicted request. That is, a request for a content object made by the client is given a higher priority than a predicted prefetch request.

At decision block 811, it is determined whether the other content object is capable of being prefetched. In one embodiment, the determination is based on the prefetchability measure, the determined location and/or the determined priority. In one embodiment, if the prefetchability measure is above a threshold, the other content object is determined to be capable of being prefetched. In one embodiment, if the location is determined to support prefetching and/or caching, the other content object is also determined to be capable of being prefetched. In any case, if it is determined that the other content object is capable of being prefetched, processing continues to block 812 where the other content object is selectively prefetched.

In one embodiment, prefetching may selectively not be performed and processing may not continue to block 812. In one embodiment, prefetching may be inhibited if the cachability and/or prefetchability measure is below a threshold or if an annotation of the link indicates that caching the other content object will cause a related object to be uncachable. If the other content object cannot be prefetched, processing returns to a calling process for further processing.

At block 812, the other content object is selectively prefetched. Prefetching may comprise requesting the other content object from a server, or other content source. The other content object may be prefetched for subsequent provisioning and/or display at the client device. In one embodiment, the prefetching may be performed at the determined location, e.g., within a browser, at a TMD, or the like. In one embodiment, if a browser behavior of the client device requesting the content object indicates client-side caching, a prefetch request is sent to the client device to enable a browser on the client device to prefetch the other content object.

In one embodiment, the prefetching may be performed at the determined priority. In one embodiment, a priority queue may be used to send requests to prefetch. A request with a priority higher than another priority of another request may be serviced before the other request. Requests that are in the prefetch queue past a threshold time limit may be removed and the associated other content object may not be prefetched. If a request (e.g., an HTTP GET request) for the other content object is received from a requesting client device, the other content object may be associated with a high priority, retrieved immediately, cached immediately, and/or provided to the requesting client device.

At block 814, the prefetched other content object is provided in response to a subsequent request for the other content object. The subsequent request may be the same or substantially the same as the link to the other content object. The cache storing the prefetched other content object may be indexed by the link. The request is sent to the cache, and the other content object is provided. The provided other content object may be used for subsequent display on the client device. Processing then returns to a calling process for further processing.

Figure 9:
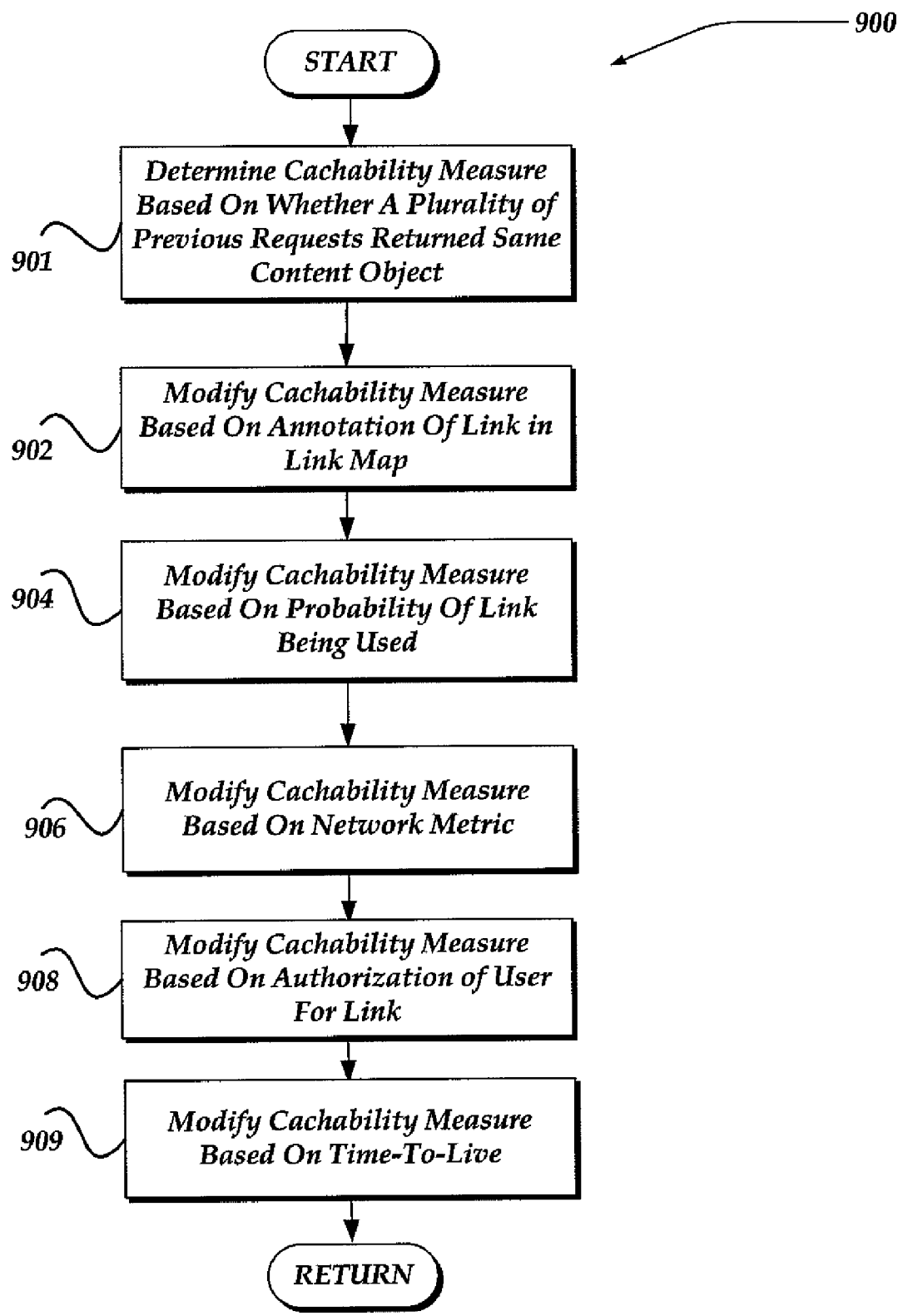
FIG. 9 illustrates a logical flow diagram generally showing one embodiment of a process for determining a cachability measure.

FIG. 9 illustrates a logical flow diagram generally showing one embodiment of a process for determining a cachability measure. Process 900 begins at block 901, where the cachability measure for at least one link to a content object is determined based on whether a plurality of previous or historical requests for the link to the content object returned the same content object. In one embodiment, a plurality of previous requests to a URL link to a content object, such as an image object, a text object, or the like, returned the same content object. Accordingly, the cachability measure is determined to have a high probability of cachability. In another embodiment, the URL link may be to a dynamic web page. A plurality of previous requests may return different content objects. Accordingly, the cachability measure is determined to have a low probability of cachability.

At block 902, the cachability measure for the link is modified based on an annotation of the link within a link map. The link map may be a map of a website, for example. At least one of the links of the website may be annotated as cachable, by an administrator, automatically by crawling the website to determine whether the same or similar information is returned for a link, or the like. If the annotation indicates cachability, the cachability measure may be increased.

At block 904, the cachability measure may be modified based on a probability of the link being used. In one embodiment, the cachability measure may be increased by a percentage, by a number of times the same content object is returned for multiple same or substantially similar requests, or the like. A probability of a subsequent link being used based on a usage of a prior link is determined. In one embodiment, the probability may be a conditional probability based on the past N visited links.

At block 906, the cachability measure may be modified based on a network metric of a connection between the client device and another device, the server and another device, or the like. The network metric may be determined by inspecting data provided at Open System Interconnection (OSI) layer 3 or above. For example, a link of a content object that is transmitted over a connection with a low latency and/or low bandwidth (e.g., over a WAN) and/or a high average response time may be determined to have a cachability measure that indicate a high likelihood of caching. In one embodiment, a rule based system may be used to determine the cachability measure. In one embodiment, determining whether to cache the other content object may be based on a rule that maps a Boolean expression of at least one of an Open System Interconnection (OSI) layer 3 or above attribute (e.g., network metric information) of the request and a caching action.

At block 908, the cachability measure may be modified based on an authorization of a user to use the link. For example, if the user is not authorized to use the link, the cachability measure may be set to indicate no cachability. In another embodiment, a link associated with a particular user may be increased for that user, but not for another user based on the user's type, authorization level, or the like.

At block 909, the cachability measure may be determined based on a time-to-live (TTL) of for the link/content object. In one embodiment, if the TTL is greater than a minimum value, the cachability measure may be set to indicate cachability, and otherwise set to indicate no cachability. In one embodiment, the minimum value may be a static value. However, in another embodiment, the minimum value may be dynamically determined through any of a variety of mechanisms. For example, one embodiment for dynamically adjusting the minimum value for a TTL for a content object that is based in part on a hit rate and change rate for the content object is described in more detail U.S. Pat. No. 6,772,203, to Feiertag et al., entitled "Updating Data Objects For Dynamic Application Caching," which is incorporated herein by reference. However, the present invention is not constrained to the approaches described in such reference, and other approaches may also be employed, without departing from the scope of the invention.

Results from each of the above described blocks (901, 902, 904, 906, 908, and 909) may be combined in any of a variety of ways to generate and/or otherwise modify the cachability measure. Thus, in one embodiment, the cachability measure may be a weighted sum of the results of each of the above blocks (e.g., a weighted sum of cachability criteria). In one embodiment, the results may be normalized, so they may be summed. For example, where a Boolean value is used for one cachability criteria, the value might be normalized to generate a probability value. However, the invention is not so limited, and other approaches for combining the results may be employed. As noted, however, it may be observed that while one or more cachability criteria may indicate a low likelihood that the content object is cacheable, other criteria might indicate a relatively higher likelihood for caching the content object.

In any event, process 900 then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method operating on one or more network devices for providing content over a network, comprising:
    receiving a request for a content object, wherein the content object includes at least one link to another content object;
    determining a cachability measure for the at least one link based on a weighted sum of probabilities of a plurality of different cachability criteria;
    determining a prefetchability measure for the at least one link based in part on the cachability measure and another factor associated with the other content object including lowering the prefetchability measure based on whether caching of the other content object causes a related third content object to be uncachable; and
    if the prefetchability measure meets a threshold selected to indicate when content objects should be prefetched, prefetching the other content object for use by a client device, wherein prefetching is further based on a combination of an attribute of the request at an Open System Interconnection (OSI) layer 3 or above and an authorization to use the link by a user associated with the request.

2. The method of claim 1, wherein the plurality of different cachability criteria further comprises at least two of information within an annotation of a link map, a probability of the link being used, or an authorization of the user to access the link.

3. The method of claim 1, further comprising:
    determining a caching behavior of the client device; and
    configuring, based on the caching behavior, the prefetching to occur either on the client device or on a proxy interposed between the client device and a server device configured to provide the other content object.

4. The method of claim 1, wherein receiving the request for the other content object further comprises:
    intercepting, on the client device, a request call of an operating system or an application interface, wherein the request call is for the content object.

5. A system for providing content over a network, comprising:
    a prefetch cache configured for storing data and one or more computer readable instructions; and
    one or more processors within one or more network devices having executing thereon:
        a request manager configured to perform first actions, including:
            receiving a request for a content object from a user; and
            parsing the content object for a link to another content object; and
        a prefetchability determiner configured to perform second actions, including:
            determining a prefetchability measure based at least on an annotation of the link within a link map and lowering the prefetchability measure for the other content object based on whether caching of the other content object will cause a related content object to be uncachable; and
        a prefetch manager configured to perform third actions, including:
            if the prefetchability measure meets a threshold selected to indicate when content objects should be prefetched, prefetching the other content object for use at a client device, wherein prefetching is further based on a combination of an attribute of the request at an Open System Interconnection (OSI) layer 3 or above and an authorization to use the link by a user associated with the request.

6. The system of claim 5, further comprising:
    a prioritization manager configured to perform fourth actions, including:
        receiving an instruction to prefetch the other content object; and
        determining whether to request the other content object if a priority associated with the content object is higher than another priority associated with at least one other content object managed by the prioritization manager.

7. The system of claim 5, further comprising:
    a crawler interposed between the client device and a server for providing the other content object, configured to perform fourth actions, including:
        storing a plurality of links in a link map based on a crawl of at least one web address;
        receiving a determined probability of a subsequent link being used based on a usage of a prior link stored in the link map; and
        enabling the prefetch cache to prefetch the other content object based on the probability.

8. The system of claim 5, further comprising:
    a rule manager configured to determine whether to cache the other content object based on a rule that maps a Boolean expression of at least one of an Open System Interconnection (OSI) layer 3 or above attribute of the request and a caching action.

9. The system of claim 5, wherein the prefetchability determiner is interposed between the client device and a server configured to provide the other content object, and is further configured to send, over a tunnel on the network, a prefetch command to the prefetch cache.

10. The system of claim 5, wherein the annotation is based in part on whether a plurality of previous requests for the link returns the other content object.

11. A network device for providing content over a network, comprising:
   a memory that stores data and instructions;
   an input interface that receives requests and sends responses; and
   a processor that performs actions embodied by at least a portion of the stored instructions, the actions comprising:
      receiving a request for a content object, wherein the content object comprises a link to another content object;
      determining a prefetchability measure based in part on whether the other content object is cachable and lowering the prefetchability measure for the other content object based on whether caching the other content object will cause another related content object to be uncachable; and
      if the other content object is determined to be capable of being prefetched based on the prefetchability measure, selectively prefetching the other content object for display at a client device, wherein prefetching is further based on a combination of an attribute of the request at an Open System Interconnection (OSI) layer 3 or above and an authorization to use the link by a user associated with the request.

12. The network device of claim 11, wherein the other content object is prefetched into a browser cache of at the client device.

13. The network device of claim 11, wherein the prefetchability measure is based on whether the link is annotated as cachable in a link map.

14. The network device of claim 11, wherein prefetching further comprises:
   if a browser behavior of the client device requesting the content object indicates client-side caching, sending a prefetch request to the client device to enable a browser on the client device to prefetch the other content object; and
   if an authorization of the client device for the link indicates remote caching, caching the other content object at the network device, wherein the network device is interposed between the client device and a server configured to provide the other content object.

15. A non-transitory, machine-readable storage medium having machine-executable instructions stored thereon, which when executed by at least one processor within one or more network devices, causes the at least one processor to perform one or more actions, comprising:
   receiving a request for a content object, wherein the content object comprises a link to another content object;
   determining a prefetchability measure for the link based in part on whether caching the other content object causes a related object to be uncachable and whether a plurality of previous requests for the link returned the other content object, wherein the prefechability measure is lowered if the caching of the other content object causes a related object to be uncachable;
   modifying the prefetchability measure based on a combination of an attribute of the request at an Open System Interconnection (OSI) layer 3 or above and an authorization to use the link by a user associated with the request; and
   based on the prefetchability measure, selectively prefetching the other content object for use at a client device.

16. The non-transitory, machine-readable storage medium of claim 15, wherein the prefetchability measure is based on an annotation of the link in a link map, a network metric, or a probability of the link being requested.

17. The non-transitory, machine-readable storage medium of claim 15, wherein likelihood of selectively prefetching the other content object is modified based on whether the other content object includes dynamic content.

18. The non-transitory, machine-readable storage medium of claim 15, further comprising:
   modifying the prefetchability measure based on a probability of the link being used by the client device requesting the content object after a usage of the requested content object.

* * * * *

UNITED STATES PATENT AND TRADEMARK OFFICE
CERTIFICATE OF CORRECTION

PATENT NO.        : 7,975,025 B1  
APPLICATION NO.   : 12/169366  
DATED             : July 5, 2011  
INVENTOR(S)       : Paul I. Szabo et al.

Page 1 of 1

It is certified that error appears in the above-identified patent and that said Letters Patent is hereby corrected as shown below:

In column 1, line 13, delete "intregal" and insert -- integral --, therefor.

In column 5, lines 55-59, below "criteria." delete "For example, prioritization may be based on a prefetchability measure, where higher prefetchability measures might receive higher priorities, although the invention is not limited to this criterion, and others may be used, without departing from the scope of the invention." and insert the same on Col. 5, Line 54, after "criteria." as the continuation of the same paragraph.

Signed and Sealed this  
Tenth Day of January, 2012

David J. Kappos  
*Director of the United States Patent and Trademark Office*